June 10, 1941. W. G. DUNN 2,245,264
WIND DRIVEN GENERATOR STRUCTURE
Filed Jan. 23, 1940
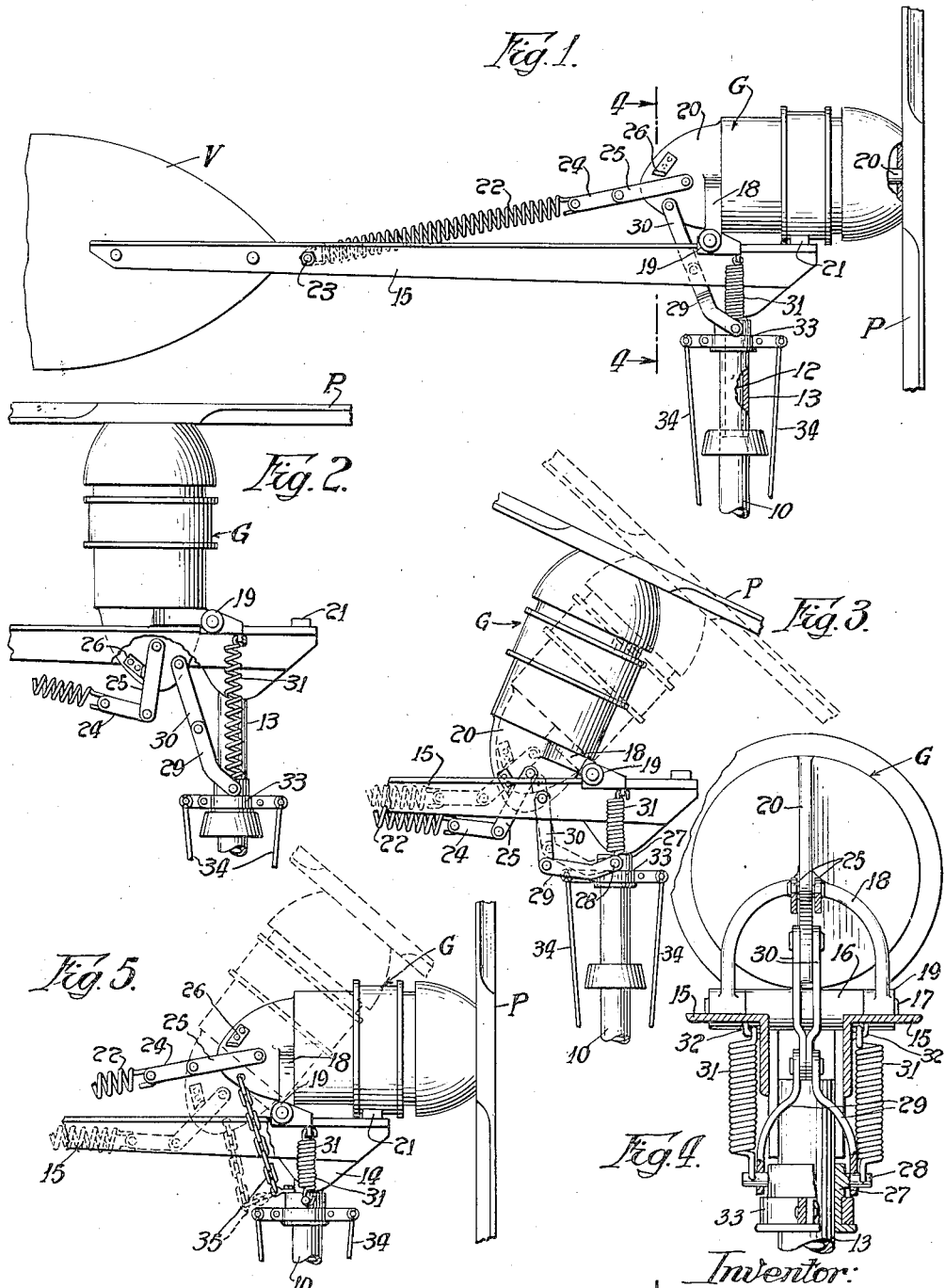
Inventor:
William G. Dunn,
By: Bair & Freeman
Attorneys.
Witness:
E. Camporini Patented June 10, 1941

2,245,264

UNITED STATES PATENT OFFICE 2,245,264

WIND DRIVEN GENERATOR STRUCTURE

William G. Dunn, Clarinda, Iowa

Application January 23, 1940, Serial No. 315,211

17 Claims. (Cl. 290—55)

My present invention relates to a wind driven structure of the general character shown in my Patent No. 2,140,152, issued December 13, 1938.

Among the objects of the present invention is to provide a manual throw-out means for a wind driven generator of the kind shown in said patent which eliminates friction encountered in the type of manual throw-out shown in the patent and which is simple and comparatively inexpensive to manufacture and assemble into the construction of the wind driven generator.

More particularly it is an object of the present invention to provide a means to bias a manual throw-out sleeve to raised position where the propeller is directed into the wind and a collapsible link connection between the throw-out sleeve and the generator so arranged that it can be utilized as a tension connection during manual throw-out operation but collapses during automatic tipping of the generator out of the wind as caused by excessive wind pressure, thereby permitting the generator to move independently of the sleeve.

Another object is to provide the collapsible connection so that it affords substantially no resistance whatever to the automatic tipping back of the generator and by reason of its collapsing action does not push the throw-out sleeve downwardly so that it subsequently has to be raised as the generator tips back toward the wind. By this arrangement I eliminate the friction caused by the sleeve sliding on the supporting post and by providing resilient means to normally keep the sleeve in raised position I eliminate the weight of the sleeve being imposed on the generator as it tips back and forward in response to changes in wind pressure.

In the accompanying drawing I have shown a preferred embodiment of my invention and a modification thereof. These drawings are not intended to be exhaustive and are not to be taken as limiting of the invention, but on the contrary are chosen with a view to illustrating my invention so that others skilled in the art may apply it under varying conditions of practical use and may make such modifications and changes therein as such conditions may make desirable.

Figure 1 is a side elevation of a wind driven generator structure embodying my invention, showing the tips of the propeller and the rear end of the directional vane omitted to conserve space on the drawing.

Figure 2 is a similar side view showing the propeller and generator manually tipped back.

Figure 3 is a similar view showing in solid lines the propeller and generator tipped back by the wind to substantially maximum position and by dotted lines tipped to an intermediate position.

Figure 4 is an enlarged sectional view on the line 4—4 of Figure 1; and

Figure 5 is a side view showing one modification of my invention.

On the accompanying drawing I have used the reference numeral 10 to indicate a supporting post. The post 10 has a reduced portion 12 on which is rotatably mounted a sleeve 13. The sleeve 13 has a pair of plates 14 secured thereto and to the plates a pair of angle bars 15 are secured. The angle bars 15 form a frame which at its rear end has a vane V secured thereto. The vane aligns the frame 15 with the wind by reason of the pivotal mounting of the sleeve 13 on the post 10—12.

A bracket 16 is secured to the angle bars 15 and supports a pivot pin 17. A generator G has a yoke 18 at its rear end whereby the generator is supported. The yoke terminates in bearings 19 pivoted on the pin 17. The generator also has a flange 20 arranged between the arms of the yoke.

The generator G includes a shaft 26 on which a propeller P is mounted. The propeller may be either directly secured to the shaft 26 or secured thereto through gearing as shown in my patent hereinbefore mentioned.

The weight of the generator G normally keeps it down against a stop block 21. A spring 22 is connected at 23 to the frame 15 and by links 24 and 25 to the flange 20. A stop 26 is arranged on the flange 20 for the link 25.

The generator G and its propeller P are adapted to be tipped back manually to the position of Figure 2 by the following described mechanism:

A throw-out sleeve 27 is slidable on the sleeve 13. The throw-out sleeve 27 has a pair of studs 28 extending therefrom. The studs 28 are connected by toggle or jack-knife links 29 and 30 to the flange 20 of the generator G.

Springs 31 are connected with ears 32 of the frame members 15 and with the studs 28 as best shown in Figure 4. The springs 31 tend to normally keep the throw-out sleeve 27 in the raised position of Figure 1. Below the studs 27 a collar 33 is rotatably but non-slidably mounted on the sleeve and throw-out rods or cables 34 are connected therewith and extend downwardly to a convenient position for operation by the user.

When the rods 34 are pulled downwardly manually as in Figure 2 against the action of the springs 31, the generator and propeller are tipped back out of the wind to an inoperative position. The rods 34 are then engaged with a suitable hook or other holding means (not shown) to keep the generator in non-operating position. When the rods are released from this hook then the springs 31 tend to swing the generator back to the position of Figure 1 against the bumper 21.

During the automatic governing action of the wind driven generator structure it is tipped back to the dotted or solid line positions of Figure 3. This is caused by the pressure of the wind against the propeller and is opposed by the weight of the generator overhanging the pivot 17 and also (after a certain point) by the spring 22 as it is stretched. The degree of tipping is in proportion to the increase in wind pressure so as to present the plane of the propeller at a greater angle to the direction of the wind when the wind pressure is high and vice versa.

It is desirable that this governing action be unrestricted and accordingly I have provided the links 29 and 30 so that they can collapse or "jack-knife" as shown in Figure 3 during the automatic governing action. The springs 31 keep the throw-out sleeve 27 in elevated position while the jack-knifing of the links prevents any imposition of friction of the throw-out sleeve 27 on the sleeve 13 or weight of the throw-out sleeve on the flange 20.

These factors therefore can be eliminated in considering the force required to tip the generator and propeller to the proper angle to secure the desired governing action. Since the friction between the elements 27 and 13 is a variable factor a much more accurate governing action can thereby be secured.

Instead of providing toggle links a chain such as shown at 35 in Figure 5 can be provided. As shown by dotted lines, the chain will readily collapse during the automatic governing action of the generator. It will serve as an effective tension connection during the manual throw-out operation.

The foregoing described invention eliminates the variable factors encountered in the design of a wind driven generator for accurate governing action.

Having described two specific embodiments of my invention together with the operation thereof, I desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention except as set forth in the claims appended hereto.

I claim as my invention and desire to secure by Letters Patent of the United States:

1. In a wind driven generator structure, an elongated frame rotatably mounted on a vertical axis, a vane for aligning said frame with the direction of the wind, a generator pivotally mounted on said frame on a horizontal axis, a propeller on the shaft of said generator for operating the generator, said pivotal mounting of said generator permitting automatic tipping of said generator and propeller to a position out of the wind, means opposing such tipping whereby the degree of tipping is in proportion to the wind pressure, means for manually tipping said generator and propeller to said position out of the wind, said last means including an element movable on the vertical axis of rotatable mounting of said frame, a toggle link connection between said element and a portion of said generator spaced from said pivotal axis, and spring means for normally retaining said vertical movable element in an elevated position, said toggle link connection jack-knifing upon automatic tipping of said generator and propeller to said position out of the wind.

2. In a wind driven generator structure, a frame rotatably mounted on a vertical axis, a vane for aligning said frame with the wind, a generator and casing therefor pivotally mounted on a horizontal axis on said frame, a propeller for operating the generator, said pivotal mounting permitting automatic tipping of said generator casing and propeller partially out of the wind in proportion to the wind pressure, resisting means opposing the automatic tipping including one portion connected to the frame and another portion having a collapsible member connected to the generator casing, an element on the casing having a collapsing contact with said collapsible member when the generator is subjected to excessive wind pressure and means for manually tipping said generator and propeller to a position out of the wind, said last means including a movable element, and a flexible connection between said element and a portion of said generator spaced from said pivotal axis, said flexible connection collapsing upon occurrence of said automatic tipping of said generator and propeller partially out of the wind.

3. A wind driven generator structure comprising a supporting frame, a generator pivotally mounted thereon, a propeller for operating the generator, said pivotal mounting of said generator permitting automatic tipping of said generator and propeller to a position out of the wind, means opposing such tipping whereby the degree of tipping is in proportion to the wind pressure, means for manually tipping said generator and propeller to said position out of the wind, said last means including a throw-out element and a flexible connection between said throw-out element and said generator, means operable at all positions of the generator normally retaining said throw-out element in a predetermined position, said flexible connection collapsing upon automatic tipping of said generator and propeller.

4. In a wind driven generator structure, a generator pivotally mounted on a horizontal axis, a propeller for driving said generator, said pivotal mounting permitting automatic tipping of said generator and propeller toward a position out of the wind with the degree of tipping in proportion to the wind pressure, means for manually tipping said generator and propeller to said position out of the wind, said last means including a throw-out element and a toggle link connection between said element and a portion of said generator spaced from said pivotal axis, and means biasing said throw-out element to a predetermined position, said toggle link connection jack-knifing upon automatic tipping of said generator and propeller toward said position out of the wind.

5. In a wind driven generator structure of the class described, a frame rotatably mounted on a vertical axis, a vane for positioning said frame with respect to the direction of the wind, a propeller journalled on said frame and pivotally mounted on a horizontal axis with relation thereto, a generator driven by said propeller, said pivotal mounting of said propeller permitting automatic tipping thereof toward a position out of the wind, means opposing such tipping so that the degree thereof is proportional to the wind pressure, means for manually tipping said propeller to said position out of the wind comprising an element movable toward and away from said pivotal mounting, a connection between said element and said propeller to effect such pivotal movement of the propeller by movement of said element in one direction and spring means biasing said element toward movement in the opposite direction, said connection collapsing upon automatic tipping of said propeller toward said out of the wind position.

6. In a wind driven generator structure, a supporting post, a propeller journalling means pivotally mounted thereon for automatic swinging movement of the propeller toward a position out of the wind with the degree of such movement being in proportion to the wind pressure against the propeller, a generator operatively connected with said propeller for rotation thereby, means for manually swinging said propeller journalling means to said position with the propeller out of the wind comprising a sleeve element slidable on said supporting post toward and away from the pivotal mounting of said propeller journalling means, a flexible element connecting said sleeve element with said propeller journalling means at a point spaced from said pivotal mounting thereof and means biasing said element to assume a position adjacent said propeller journalling means, said flexible element, by collapsing action, permitting movement of said propeller journalling means automatically to said position out of the wind without imposing frictional resistance against such movement as caused by the sliding of said sleeve element on said supporting post.

7. A wind driven generator structure comprising a supporting post, propeller journalling means pivotally mounted thereon for automatic swinging movement of the propeller toward a position out of the wind, a generator operatively connected with said propeller for rotation thereby, means for manually swinging said propeller journalling means to said position with the propeller out of the wind comprising an element telescopically slidable to a predetermined position with relation to said supporting post, a toggle link connecting said element with said propeller journalling means at a point spaced from said pivotal mounting thereof and means biasing said element to assume one position, said element being manually movable against the force of said biasing means to said predetermined position, said toggle link, by collapsing action, permitting movement of said propeller journalling means automatically toward said position out of the wind without interference therewith or without imposing frictional resistance against such movement.

8. A wind driven structure comprising propeller journalling means pivotally mounted for automatic swinging movement of the propeller toward a position out of the wind with the degree of such movement being in proportion to the wind pressure against the propeller, means for manually swinging said propeller journalling means to thrown-out position with the propeller out of the wind comprising a throw-out element slidably mounted for movement toward and away from the pivotal mounting of said propeller journalling means, a flexible element connecting said throw-out element with said propeller journalling means at a point spaced from said pivotal mounting thereof and means biasing said element to assume a position adjacent said propeller journalling means, said throw-out element being manually movable to position spaced therefrom to accomplish movement of said propeller journalling means to said thrown-out position, said flexible element collapsing and thereby permitting movement of said propeller journalling means automatically toward said position out of the wind without interference of said throw-out element therewith.

9. In a wind driven generator structure, a supporting post, propeller journalling means having a horizontal pivotal connection therewith for automatic swinging movement of the propeller toward a position out of the wind, the degree of such movement being in proportion to the wind pressure against the propeller, a generator operatively connected with said propeller for rotation thereby, means for manually swinging said propeller journalling means to said position with the propeller out of the wind comprising a sleeve element slidable on said supporting post, a toggle link connecting said sleeve element with said propeller journalling means at a point spaced from said pivotal connection thereof and spring means biasing said sleeve element to assume an elevated position adjacent said propeller journalling means, said toggle link, by jack-knifing action, permitting movement of said propeller journalling means automatically toward said position out of the wind independently of said sleeve element.

10. In a wind driven generator structure, a vertical support, a frame pivotally mounted thereon, a vane connected to said frame, a propeller journalled on said frame and pivoted thereto for tipping from a position with its axis of rotation horizontal toward a position with its axis of rotation vertical as a result of excessive wind pressure against said propeller, a generator driven by said propeller, means opposing such tipping of the propeller and a manual control for so tipping the propeller, said manual control comprising an element vertically slidable on said vertical support and a collapsible connection between said element and said propeller, which connection permitting automatic movement of the propeller to position with its axis of rotation vertical without movement of said element and spring means urging said element to remain in normal position corresponding to said axis of rotation of said propeller being horizontal.

11. A wind driven structure of the class described comprising a vertical support, a frame pivotally mounted thereon, a vane connected to said frame, a propeller journalled on said frame and pivoted thereto for tipping from a position with its axis of rotation horizontal toward a position with its axis of rotation vertical as a result of excessive wind pressure thereagainst, and a manual control for so tipping said propeller, comprising a throw-out element slidable on said vertical support and a collapsible connection between said element and said propeller, said connection permitting automatic movement of the propeller to position with its axis of rotation vertical without movement of said element.

12. A wind driven structure comprising a vertical support, a frame pivotally mounted thereon, a vane supported by said frame, propeller journalling means on said frame and having pivotal connection thereto, a propeller journalled on said propeller journalling means for tipping from a position with its axis of rotation horizontal toward the position with its axis of rotation vertical as a result of excessive wind pressure against said propeller, and manual means for also tipping said propeller journalling means and said propeller toward position with the axis of rotation of the propeller vertical, said last means including an element vertically slidable on said supoprt, and collapsible link means connecting said element with said propeller journalling means at a point spaced from the pivotal axis thereof to said frame.

13. In a wind driven generator structure, a support, a frame pivotally mounted thereon, a vane supported by said frame, a propeller journalling means having connection on a pivotal axis with said frame, a propeller journalled on said propeller journalling means for tipping from a position with its axis of rotation horizontal toward the position with its axis of rotation vertical as a result of excessive wind pressure against said propeller, a generator driven by said propeller and manual means for also tipping said propeller journalling means and said propeller toward position with the axis of rotation of the propeller vertical comprising an element movable on said support, spring means normally biasing said element to one position with the propeller axis horizontal, said element being manually movable to an opposite position with the propeller axis vertical and collapsible means connecting said element with said propeller journalling means at a point spaced from said pivotal axis.

14. In a wind driven generator of the character disclosed, a frame, means for mounting said frame for pivotal movement on a vertical axis, a vane supported by said frame, a generator having a member pivoted to said frame between said vertical axis and said vane, a propeller for driving said generator, a projection on said generator, a spring connection between said projection and said frame to oppose tipping movement thereof in proportion to wind pressure increase and means for manually tipping said member to extreme wind pressure position comprising an element movable toward and away from said member, spring means biasing said element to remain adjacent said member and a collapsible connection between said element and said projection on said generator, said collapsible element serving as a tension connection between said element and member when the element is manually moved downwardly and collapsing when the member is pivotally moved by excess wind pressure against the propeller thereby permitting movement of the member independent of the element.

15. A wind driven propeller operated structure adapted to be governed by wind pressure comprising a vertical support, a frame rotatably mounted on the support, a propeller mounting including a pivotal connection with the frame permitting the mounting to tilt in a vertical plane, manual means for tilting the mounting comprising an extension element adapted to be grasped by an operator, a vertically shiftable element on the support attached to the extension element, resilient means connecting said shiftable element and the support normally holding said manual means at a position inoperable relative to said mounting, and a collapsible link connection attached respectively to said shiftable element and said mounting resistant to tension and nonresistant to compression between the ends.

16. A wind driven propeller operated structure adapted to be governed by wind pressure comprising a vertical support, a frame rotatably mounted on the support, a propeller mounting including a pivotal connection with the frame permitting the mounting to tilt in a vertical plane when wind pressure increases, alternatively operable remote means for tilting the mounting comprising an extension element adapted to be actuated by remote energy, a vertically shiftable element on the support attached to the extension element, resilient means connecting said shiftable element and the support normally holding said remote means at a position inoperable relative to said mounting and a collapsible linked connection attached respectively to said shiftable element and said mounting resistant to tension and nonresistant to compression between its ends operable by movement of said remote means to shift the position of the mounting in one direction and inoperative by movement of said remote means to shift the mounting toward an opposite direction.

17. A wind driven propeller operated structure adapted to be governed by wind pressure comprising a vertical support, a frame rotatably mounted on the support, a propeller mounting including a pivotal connection with the frame permitting the mounting to tilt in a vertical plane to a plurality of positions between a full speed position perpendicular to the wind and an inoperative position substantially parallel to the wind and adapted to tilt when wind pressure increases, an alternatively operable manual means for tilting the mounting comprising an extension element adapted to be grasped by an operator, a vertically shiftable element on the support movable to a plurality of positions between full speed and inoperative positions attached to the extension element, resilient means connecting said shiftable element and the support normally holding said manual means at a position inoperable relative to said mounting and a collapsible non-resilient linked connection connecting respectively said shiftable element and said mounting, said connection being resistant to tension and nonresistant to compression between its ends and operable by movement of said manual means to shift the mounting from full speed position to any of said remaining plurality of positions and inoperative by movement of said manual means to shift the mounting toward a full speed position.

WILLIAM G. DUNN.